US010117294B2

United States Patent
Beifuss et al.

(10) Patent No.: US 10,117,294 B2
(45) Date of Patent: Oct. 30, 2018

(54) HOUSEHOLD APPLIANCE COMPRISING A FOOD PROCESSING CHAMBER AND CAMERA (71) Applicant: BSH Hausgeräte GmbH, Munich (DE)

(72) Inventors: Wolfgang Beifuss, Chieming (DE); Uwe Has, Unterneukirchen (DE)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 15/312,795

(22) PCT Filed: Jun. 3, 2015

(86) PCT No.: PCT/EP2015/062384
§ 371 (c)(1),
(2) Date: Nov. 21, 2016

(87) PCT Pub. No.: WO2015/185632
PCT Pub. Date: Dec. 10, 2015

(65) Prior Publication Data
US 2017/0188416 A1 Jun. 29, 2017

(30) Foreign Application Priority Data
Jun. 5, 2014 (DE) .................. 10 2014 210 668

(51) Int. Cl.
*H05B 6/80* (2006.01)
*H05B 6/64* (2006.01)
*H04N 5/225* (2006.01)

(52) U.S. Cl.
CPC ......... *H05B 6/6414* (2013.01); *H04N 5/2257* (2013.01); *H05B 6/64* (2013.01); *H05B 6/6417* (2013.01)

(58) Field of Classification Search
CPC ...... H05B 6/64; H05B 6/6414; H05B 6/6417; H05B 6/6426; H05B 6/763; H04N 5/2257
(Continued)

(56) References Cited

U.S. PATENT DOCUMENTS 4,051,341 A * 9/1977 Tanaka .................. H05B 6/763
  174/389
4,963,709 A * 10/1990 Kimrey, Jr. ............. C04B 35/64
  219/686
(Continued)

FOREIGN PATENT DOCUMENTS

DE 102010029197 A1 11/2011
EP 2515044 A1 10/2012
(Continued)

OTHER PUBLICATIONS

International Search Report PCT/EP2015/062384 dated Aug. 6, 2015.
National Search Report DE 10 2014 210 668.0 dated Apr. 13, 2015.

*Primary Examiner* — Alexander Valvis
(74) *Attorney, Agent, or Firm* — Michael E. Tschupp; Andre Pallapies; Brandon G. Braun (57) ABSTRACT

A household appliance constructed in the form of a microwave appliance includes a food treatment chamber having a loading opening which is closeable by a door, with the food treatment chamber being exposable to microwaves. A camera is provided to observe the food treatment chamber through a viewing window. Received in the viewing window is a shielding plate which includes a number of holes. The camera is fastened to holes in the shielding plate and directed onto the shielding plate such that at least one hole is in a field of view of the camera.

17 Claims, 12 Drawing Sheets

(58) Field of Classification Search
USPC .................................................. 219/678–764
See application file for complete search history.

(56) References Cited

U.S. PATENT DOCUMENTS

| | | | | |
|---|---|---|---|---|
| 6,559,882 B1 * | 5/2003 | Kerchner | ............. | H05B 6/6435 |
| | | | | 219/506 |
| 7,304,275 B2 * | 12/2007 | Chun | .................. | H05B 6/6441 |
| | | | | 219/497 |
| 2004/0009092 A1 * | 1/2004 | Diaferia | ................ | A01M 19/00 |
| | | | | 422/21 |
| 2004/0056028 A1 * | 3/2004 | Kim | ..................... | H05B 6/6414 |
| | | | | 219/739 |
| 2006/0118553 A1 * | 6/2006 | Terada | ................... | H05B 6/763 |
| | | | | 219/739 |
| 2014/0203012 A1 * | 7/2014 | Corona | ................. | H05B 6/686 |
| | | | | 219/705 |
| 2015/0136760 A1 * | 5/2015 | Lima | ..................... | H05B 6/705 |
| | | | | 219/709 |

FOREIGN PATENT DOCUMENTS

| | | |
|---|---|---|
| JP | H1163509 A | 3/1999 |
| JP | 2006145142 A | 6/2006 |
| JP | 2008298299 A | 12/2008 |

* cited by examiner

HOUSEHOLD APPLIANCE COMPRISING A FOOD PROCESSING CHAMBER AND CAMERA

CROSS-REFERENCES TO RELATED APPLICATIONS

This application is the U.S. National Stage of International Application No. PCT/EP2015/062384, filed Jun. 3, 2015, which designated the United States and has been published as International Publication No. WO 2015/185632 A1 and which claims the priority of German Patent Application, Serial No. 10 2014 210 668.0, filed Jun. 5, 2014, pursuant to 35 U.S.C. 119(a)-(d).

BACKGROUND OF THE INVENTION

The invention relates to a household appliance, having a food treatment chamber, which has a loading opening that can be closed by a door, and at least one camera for observing the food treatment chamber through a viewing window. The invention can be applied particularly advantageously to microwave appliances and combined oven/microwave appliances.

A customer buying a typical household food treatment appliance generally wants to be able to see the progress of a food treatment process (e.g. a roasting, baking or cooking process) in a food treatment chamber (e.g. in a cooking chamber such as an oven). To this end a door, which can close a loading opening of the food treatment chamber, frequently has a viewing region with a large front pane of glass. One disadvantage of this is that more energy is lost through the front pane of glass than through other walls of the food treatment chamber with better thermal insulation.

To minimize energy consumption the viewing region can be omitted so that said region can be more effectively insulated. So that the user can still monitor the treatment process taking place in the food treatment chamber, a camera is incorporated in the appliance, observing or monitoring the food treatment chamber continuously. The acquired images are displayed on a screen of the appliance. This allows the customer to observe the food treatment chamber and control the treatment process as usual, influencing it as required by changing the oven settings.

With microwave appliances the problem arises that the camera and associated electronics cannot be exposed to microwave radiation as this may impair their function or they may even be destroyed by the microwave radiation.

BRIEF SUMMARY OF THE INVENTION

It is the object of the present invention to overcome at least some of the disadvantages of the prior art and in particular to provide a way of monitoring a food treatment chamber of a household microwave appliance using a camera in a manner that is easy to implement.

This object is achieved according to the features of the independent claims. Preferred embodiments will emerge in particular from the dependent claims.

The object is achieved by a household appliance, having a food treatment chamber, which has a loading opening that can be closed by a door, and at least one camera for observing the food treatment chamber through a viewing window, the household appliance being a microwave appliance, it being possible for microwaves to be applied to the food treatment chamber thereof, the viewing window having a shielding plate (also referred to as a perforated plate) with a number of holes, the camera being directed onto the shielding plate in such a manner that at least one hole in the shielding plate is in the field of view of the camera and the camera being fastened to a number of holes in the shielding plate.

This has the advantage that because the camera is fastened to a number of holes in the shielding plate, the visible range of the camera on the shielding plate is known precisely and can be preset. This ensures that the camera (in particular its lens) is positioned and aligned in such a manner that it allows a predefined and adequate view through the shielding plate into the food treatment chamber. Because it is fastened to the holes, the camera can be positioned accurately using simple means to allow a view through the shielding plate, in particular without the need for additional adjustment elements, markings, etc., which are either expensive to provide with high precision or introduce additional position tolerances. If the optical axis or visual axis of the camera is oriented with precise definition in relation to the holes in the shielding plate, this significantly facilitates automatic image evaluation or image processing to allow a user-friendly display on a screen. There is no need for the front pane of glass to allow a user to see into the food treatment chamber.

The household appliance is therefore a household microwave appliance for food treatment. It may be an independent appliance, e.g. a microwave appliance. Alternatively it may be an appliance with at least one other food treatment function (combination appliance), e.g. an oven and/or a steam treatment appliance with a microwave function.

The food treatment may comprise in particular the heating or cooking of the food to be treated. The food treatment chamber may then also be referred to as a cooking chamber.

The household appliance may have one or more cameras. These can be directed onto a respective viewing window. Also at least two cameras may be directed onto a common viewing window.

A camera refers to a photographic apparatus, which captures a sequence of static images or moving images (videos, streams, etc.). The camera may in particular be a digital camera.

In one development the at least one camera is connected to a control facility of the household appliance, for example for automatically controlling a food treatment sequence based on the images captured by the camera. To this end the images may be subjected to image processing. The household appliance may have a corresponding image processing function, e.g. in the form of a dedicated image evaluation facility or as a function of the control facility. Image processing can be used additionally or alternatively to process, for example to sharpen or correct in respect of color, the images captured by the camera so they can be displayed more clearly for a user.

In a further development the images captured by the at least one camera can be displayed on a screen of the household appliance. The screen may be a liquid crystal screen or an OLED screen. The screen may be a color screen.

In another development the images captured by the camera can be transmitted to an external device, for example a computer or smartphone, tablet, etc. This allows remote monitoring of the food treatment. To this end the household appliance may be equipped with a wireless and/or wired transmit facility for transmitting at least some of the images captured by the at least one camera, e.g. a USB interface, an Ethernet interface, a radio transmitter, etc.

The viewing window may in particular comprise an aperture in at least one wall delimiting the food treatment chamber, e.g. an aperture in an inner wall of the door or muffle. Such a viewing window can be configured much smaller than a conventional viewing region for a user, thereby allowing thermal loss to be significantly reduced.

The fact that microwaves can be applied to the food treatment chamber may mean that microwaves can be radiated into it. To this end the household appliance may have a microwave generation facility that generates microwaves, e.g. a magnetron. The microwaves may be guided into the food treatment chamber by means of a microwave guide, e.g. through a ceiling and/or side wall.

A shielding plate may refer in particular to a flat body with an at least essentially constant thickness. The thickness is preferably less than 3 millimeters (thin plate), preferably less than one millimeter. The shielding plate may be made of metal, e.g. copper. In the case of metal it may be made of a finished rolled product. It has the attribute that it cannot be penetrated by the microwaves generated by the appliance despite the holes.

The holes are typically very small and only disrupt the view through from a greater distance to a very minor degree. This is particularly so when the diameter of the camera lens is in the region of up to approx. 2 mm. However if the eye of an observer or a camera lens is very close (e.g. in the region of several millimeters up to approx. one centimeter) to the shielding plate, the holes can clearly be seen. The holes can be introduced into the shielding plate by stamping, pressing, cutting, etching, etc.

The holes are arranged in the shielding plate in particular in a regular pattern. The regular pattern may be for example a matrix-type pattern, in which the holes are arranged in perpendicular rows and columns. The regular pattern may also be a pattern with alternating lines and/or columns offset by half a position. Such a pattern may have a hexagonal unit cell. However the holes may also be in a ring-type pattern with the introduction of for example one or more rings arranged around a central hole.

That the camera is fastened to a number of holes in the shielding plate also includes in particular the camera being fastened to the holes directly or by way of a holder.

In one embodiment an optical axis or visual axis of the camera or the associated lens is directed onto a point of the shielding plate which is a center point of the group of holes in the field of view of the camera. This allows a particularly regular image quality to be achieved in a peripheral direction.

In a further embodiment at least the group of holes in the field of view of the camera has an at least two-fold rotational symmetry, in particular about a point of intersection with the visual axis or optical axis. This corresponds in particular to a rotational symmetry through 180° about the center of the field of view. The rotationally symmetrical arrangement improves the regular image quality. The higher the number n of the n-fold rotational symmetry, the more regular the achievable image quality. In one development at least the group of holes in the field of view of the camera has a three-fold, four-fold, five-fold, six-fold or eight-fold rotational symmetry.

The shape of the holes is not limited and may be for example free, circular, oval or m-cornered (where m>=3). A four-cornered hole may have for example the shape of a parallelogram, specifically a lozenge, specifically a rectangle, specifically a square. The lozenge may be equiangular or compressed. The holes may have in particular a pentagonal, hexagonal or octagonal shape. A number of different angular basic shapes may also be superimposed for example, e.g. a combination of a square and octagon.

In one embodiment the camera is latched to a number of holes in the shielding plate. Latching allows the camera to be fastened to the shielding plate in a manner that is easy to implement, has long-term stability and is secure. Alternatively or additionally the camera may be fastened (directly or by way of a holder) to the holes with a force fit (e.g. by clamping) and/or with a material fit (e.g. by means of an adhesive). To this end the camera (itself or a holder) may be inserted into the holes, in particular without or with little play.

In a further embodiment the camera or its support has latching elements (e.g. hooks or lugs) for latching into the holes. The latching elements allow the camera to be fastened to the cover plate by means of simple pressure. The latching elements in particular have a latching dimension that allows them to fit into the holes in the shielding plate. The latching elements in particular have an arrangement that corresponds in particular to a whole-number multiple of the distances between the holes in the shielding plate. The camera can then only be attached to the shielding plate when all the lugs latch in, e.g. during latching. If this is not the case (e.g. due to lateral displacement and/or twisting away from the correct position), the camera slides over the plate.

In a further embodiment at least one of said latching elements has a narrow tip. Its at least initially small width allows easy positioning and simple insertion of the associated latching elements into the associated holes. The tip can also serve as a spacer or stop for an object arranged on the side of the shielding plate facing away from the camera. In one development all the latching elements have such a tip.

In a further embodiment the shielding plate is flat and the camera is directed obliquely onto the shielding plate (not in a perpendicular manner). This allows a particularly compact structure to be achieved. If the camera is incorporated in the door, the door can therefore be relatively slim. An oblique alignment of the camera may refer in particular to an alignment whereby the visual axis or optical axis of the camera is aligned perpendicular to the shielding plate or parallel to a surface normal at the point of intersection with the shielding plate. Similarly an oblique alignment of the camera can refer in particular to an alignment whereby a visual axis of the camera is not perpendicular to the shielding plate (but at an angle other than 90°) or is aligned at an angle to a surface normal at the point of intersection with the shielding plate.

In a further embodiment the shield plate is a flat plate and the camera is directed onto the shielding plate in a perpendicular manner. In contrast to an oblique alignment of the camera onto the shielding plate, this allows the full surface of the holes to be utilized for a view into the food treatment chamber, with the result that particularly good image quality can be achieved. The shielding plate can also be kept particularly small. Also any waviness of the shielding plate has little or no adverse effect on image quality in this embodiment.

In another embodiment the shielding plate is at an angle to a vertical or vertical spatial direction. This combines a compact structure with improved image quality. As the shielding plate and associated viewing window are relatively small, only a little space is required for the angled arrangement. In one development the shielding plate is at an angle to the vertical and the camera is directed obliquely onto the shielding plate. In a further development the shielding plate is at an angle to the vertical and the camera is directed onto the shielding plate in a perpendicular manner. The angle of inclination of the camera or its visual axis in relation to a horizontal then corresponds in particular to the angle of inclination of the shielding plate in relation to the vertical.

In yet another embodiment the shielding plate is arched in the direction of the food treatment chamber, e.g. arched in the manner of a spherical cap. Thus when a camera is arranged close to the shielding plate, an at least approximately equal distance can be achieved between the lens and the holes. The arrangement of the holes on the surface of the shielding plate then corresponds for example to an arrangement of holes in the manner of a truncated icosahedron, similar to the structure of a football for example, the surface of which is made up of pentagons and hexagons.

In another embodiment the edges of the holes in the shielding plate are rounded in cross section. This prevents color errors in the image, which can result in optical diffraction phenomena, for example in the case of sharp edges as occur for example due to unclean stamping processes.

In another embodiment the camera and viewing window are arranged in the door. This is advantageous as the camera then captures events occurring in the food treatment chamber from one angle of view which corresponds at least approximately to the angle of view when looking in through a front pane of glass and is thus intuitively easy to comprehend for the customer. However the household appliance is not restricted to this. Alternatively or additionally it may have at least one further camera, which is in particular not positioned on the door but for example on a ceiling and/or on at least one side wall and/or on a rear wall of the housing or wall delimiting the food treatment chamber. An arrangement on the ceiling allows a particularly good view of the only or topmost food plane. The use of a number of cameras allows particularly accurate observation or monitoring of the food treatment chamber. When a number of cameras are used, the images (including videos) from at least two cameras, in particular from all cameras, can be displayed together on a screen, which allows particularly comprehensive monitoring. In a further development the images from different cameras can be displayed alternately on the screen, it being possible for example for the user to select the camera for display.

In a further embodiment the camera is fastened to at least two lines of holes in the shielding plate, with the field of view of the camera being located between these. This allows the camera to be positioned particularly securely with relatively few latching elements, without restricting its field of view.

In a further embodiment the viewing window has a transparent pane, which is arranged between the shielding plate and the food treatment chamber. The pane serves as a protective cover, for example against splashing and vapors, and optionally as a thermal insulation element. The pane may be made of plastic or glass.

In a further embodiment the pane is arranged at a distance from the shielding plate. This allows latching elements of the camera to latch behind the holes in the shielding plate easily. If the latching elements have tips projecting in the direction of the pane, these can serve as spacers and/or braces for the pane.

BRIEF DESCRIPTION OF THE DRAWINGS

The attributes, features and advantages of this invention as described above as well as the manner in which these are achieved will become clearer and more comprehensible in conjunction with the following schematic description of an exemplary embodiment, which is explained in more detail in conjunction with the drawings.

DETAILED DESCRIPTION OF EXEMPLARY EMBODIMENTS OF THE PRESENT INVENTION

Figure 1:
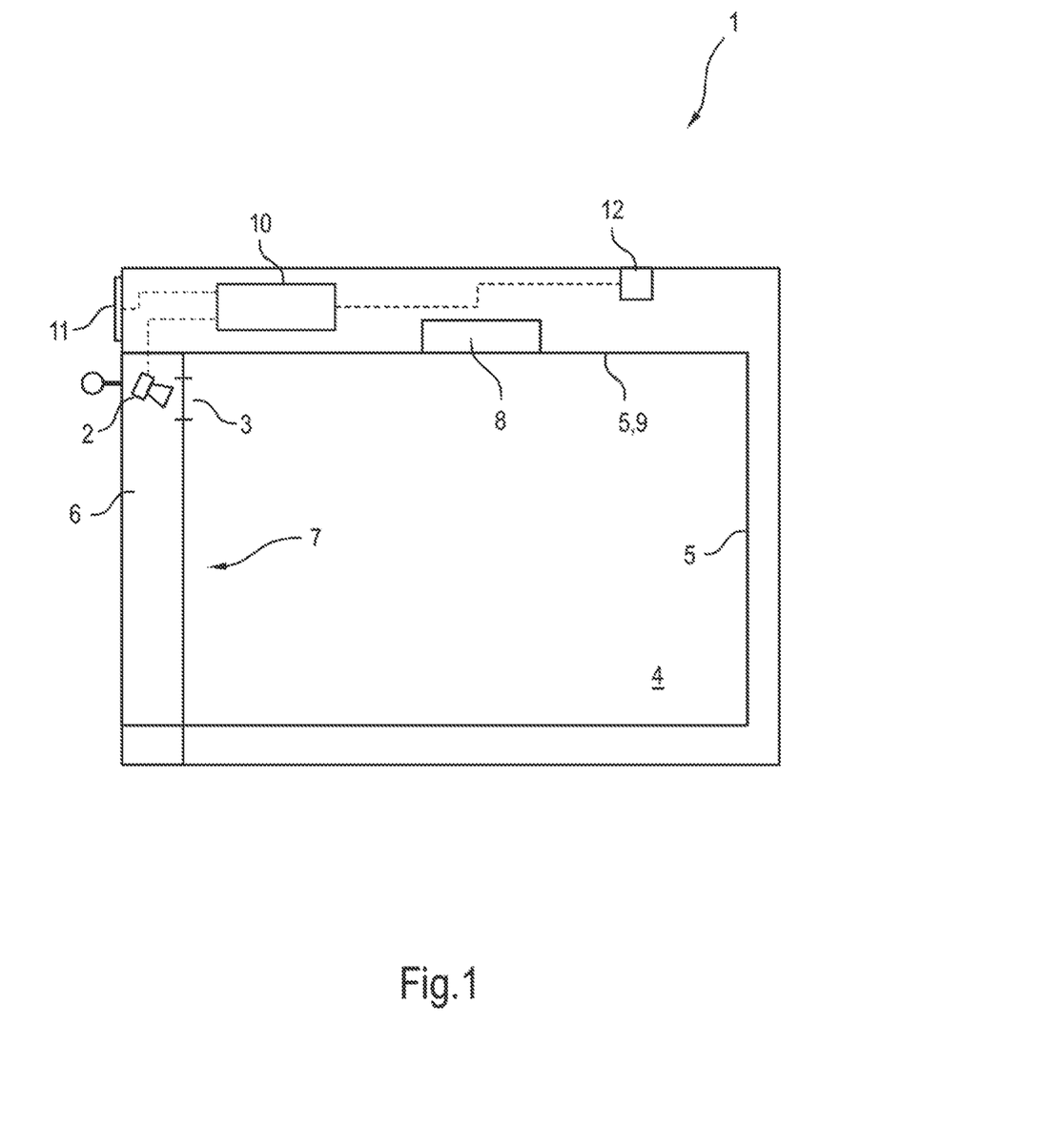
FIG. 1 shows a sectional diagram of a side view of a household microwave appliance with a camera and a viewing window for it.

FIG. 1 shows a sectional diagram of a side view of a household microwave appliance 1 with a camera 2 and a viewing window 3 for it. The household microwave appliance 1 is for example an independent microwave appliance or a combined oven/microwave oven. The household microwave appliance 1 has a food treatment chamber 4, which is enclosed by a wall or muffle 5, which has a loading opening 7 at the front, which can be closed by means of a door 6. The camera 2, configured here as a digital camera for capturing individual images or image sequences (videos, streams, etc.) is housed in the door 6. The camera 2 is used to observe the food treatment chamber 4 through the viewing window 3.

The household microwave appliance 1 has a magnetron 8, which generates microwaves, which can be guided through a ceiling 9 of the muffle 5 into the food treatment chamber 4, thereby applying microwaves thereto.

The camera 2 is connected to an image processing facility 10, which processes the images captured by the camera 2, e.g. processing them so that they can be displayed more clearly on a screen 11. A user can therefore look at images from the food treatment chamber 4 on the screen 11. The screen 11 may be for example a liquid crystal screen (e.g. LCD screen, TFT screen, etc.) or an LED screen (e.g. an OLED screen). It is connected to the image processing facility 10. The image processing facility 10 may be an independent unit or may be for example a central control facility of the household microwave appliance 1, which then has an imaging processing function. The image processing facility 10 is connected here to an interface 12 with at least one external device (not shown), e.g. a smartphone, tablet, etc. The interface 12 may be a unidirectional or bidirectional wireless and/or wired interface, e.g. an Ethernet, USB, Firewire or serial interface or a radio or IR interface, e.g. a Bluetooth or WLAN interface.

Figure 2:
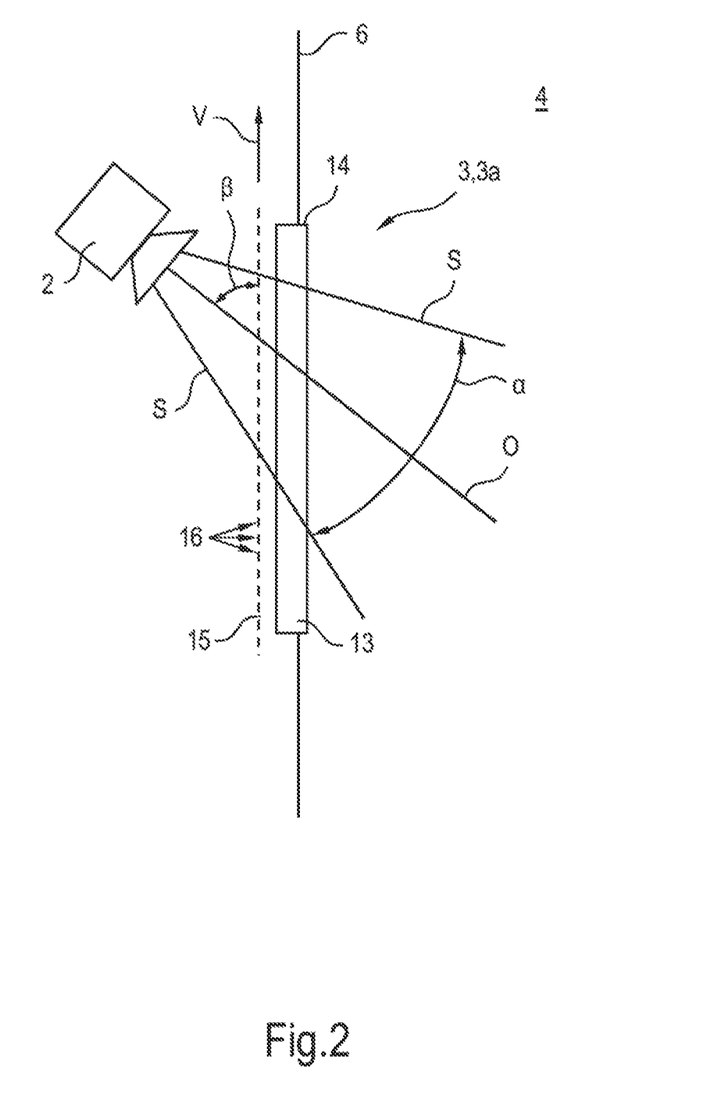
FIG. 2 shows a sectional diagram of a side view of a first possible embodiment of the household microwave appliance in the region of camera and viewing window.

FIG. 2 shows a first possible embodiment of the household microwave appliance 1 in the region of camera 2 and viewing window 3, 3a. The viewing window 3, 3a has a transparent glass pane 13 in a cutout 14 in the door 6 facing the food treatment chamber 4. The glass pane 13 prevents vapors or splashes penetrating into the door 6. At a uniform distance from the glass pane 13 in the door 6 (and therefore on the side of the glass pane 13 facing away from the food treatment chamber 4) is an, in this instance flat, shielding plate 15 for shielding microwaves passing through the glass pane 13. The camera 2 is behind the shielding plate 15 and is therefore protected from microwave radiation.

The shielding plate 15 is made of a thin sheet metal part, in which a number of holes 16 have been introduced, e.g. by stamping, laser welding, etc. The edges of the holes 16 are rounded in cross section, to reduce optical diffraction phenomena for example.

The camera 2 is directed onto the shielding plate in such a manner that at least one hole 16 is in a field of view S of the camera 2. The camera 2 is fastened to a number of holes 16 in the shielding plate 15 by latching. Latching the camera 2 (directly or by way of a holder) to the holes 16 in the shielding plate 15 allows precisely defined alignment and positioning of the field of view S using simple means.

The field of view S of the camera 2 here is positioned by way of example symmetrically, specifically in a circular manner, about its optical axis or visual axis O. One edge of the field of view S here forms half an opening angle α/2 with the visual axis O. The mapping or projection of the field of view S onto the shielding plate 15 can be referred to as the "field of view on the shielding plate" or the visible area.

Alignment of the camera 2 onto the shielding plate 15 is determined by the angle β between the visual axis O and the surface of the shielding plate 15. If the angle β=90°, reference is also made to perpendicular alignment; with an angle in the region of ]0°; 90°[ or]90°; 180°[, reference is also made to an oblique alignment. If the point of intersection of visual axis O and shielding plate 15 is geodetically above the starting point of the visual axis O at the camera 2, reference can also be made to an alignment from obliquely below, while if the point of intersection of visual axis O and shielding plate 15 is geodetically below the starting point of the of the visual axis O at the camera 2, reference can be made to an alignment from obliquely above. This FIG. 2 shows an alignment of the camera 2 onto the shielding plate 15 which is aligned vertically or along a vertical V, from obliquely above. Such an arrangement is very compact and can in particular keep the required thickness of the door 6 thin.

If the angle of the view through the shielding plate 15 is very acute (in other words the visual axis O is at a very small "smallest" angle to the shielding plate 15), the shielding plate 15 becomes practically opaque, because the still visible smallest diameter of the holes 16 in the shielding plate 15 is not much bigger than the thickness of the shielding plate 15. This may be the case for example in FIG. 2 for a certain angular region around the marked lower boundary of the visible range S. This effect is strengthened if thin shielding plates 15 are not completely flat but are rather distorted and therefore wavy. The nature of the waves in the edge region of the field of view S can then produce a blind spot.

Figure 3:
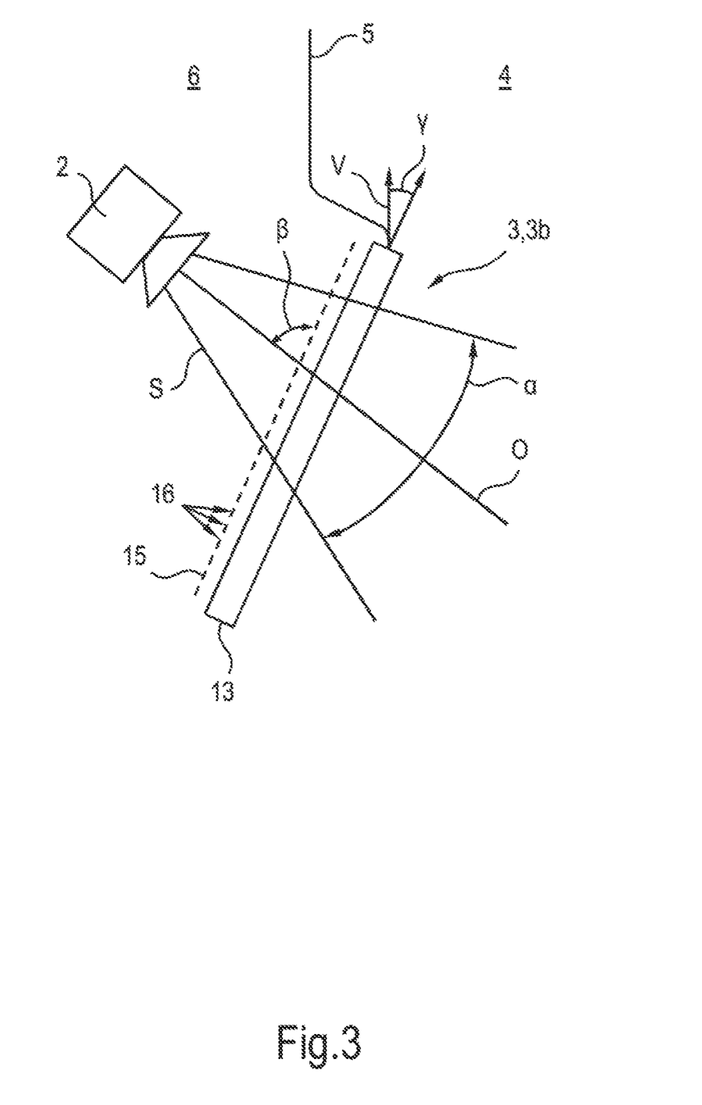
FIG. 3 shows a sectional diagram of a side view of a second possible embodiment of the household microwave appliance in the region of camera and viewing window.

In order to avoid acute angles β in the field of view S, the shielding plate 15 itself can be angled at an angle γ to the vertical V, as shown in FIG. 3. The glass pane 13 of the viewing window 3, 3b may also be at an angle to the vertical V here, for example such that it is parallel to (but preferably at a distance from) the shielding plate 15 again (in other words also at an angle γ). The entire viewing window 3, 3b is at an angle γ to the vertical V here. This means that with the same alignment of the camera 2, the angle β is greater than in FIG. 2 or approaches 90° (by the value of the angle γ), so that the optical compression of the holes 16 is smaller. This also results in a more regular image quality in a peripheral direction about the visual axis O.

Figure 4:
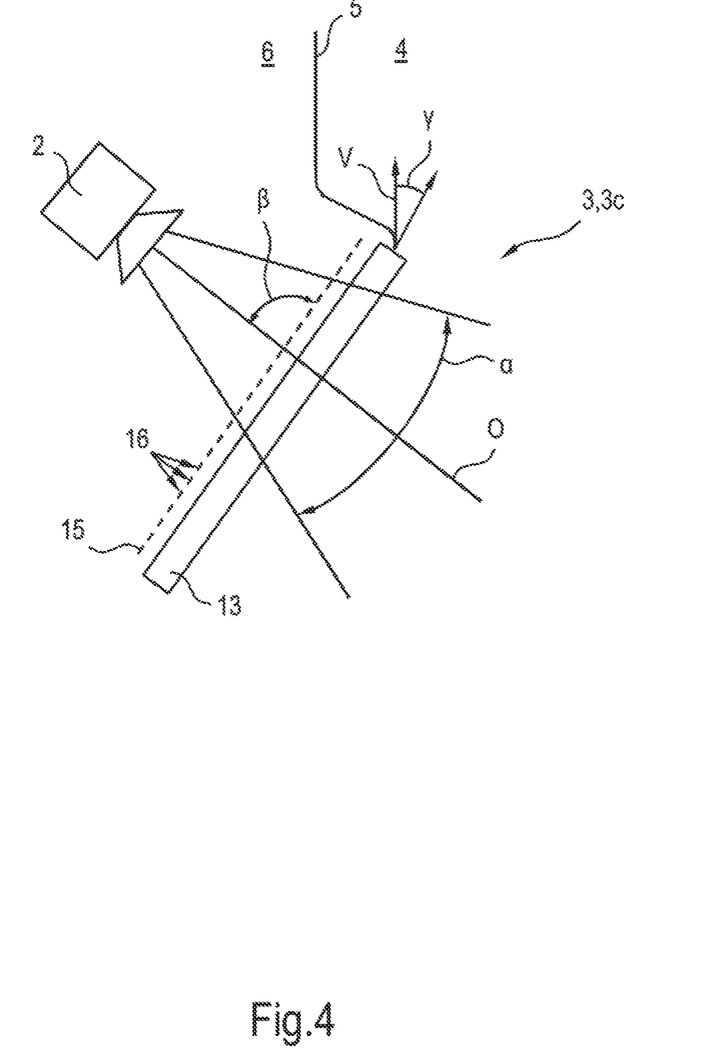
FIG. 4 shows a sectional diagram of a side view of a third possible embodiment of the household microwave appliance in the region of camera and viewing window.

FIG. 4 shows a sectional diagram of a side view of a third possible embodiment of the household microwave appliance 1 in the region of camera 2 and viewing window 3, 3c. Like the viewing window 3b, the viewing window 3c is at an angle to the vertical V but to such a degree here that the visual axis O is directed onto the shielding plate 15 in a perpendicular manner. This results in a particularly regular image quality in a peripheral direction about the visual axis O.

Figure 5:
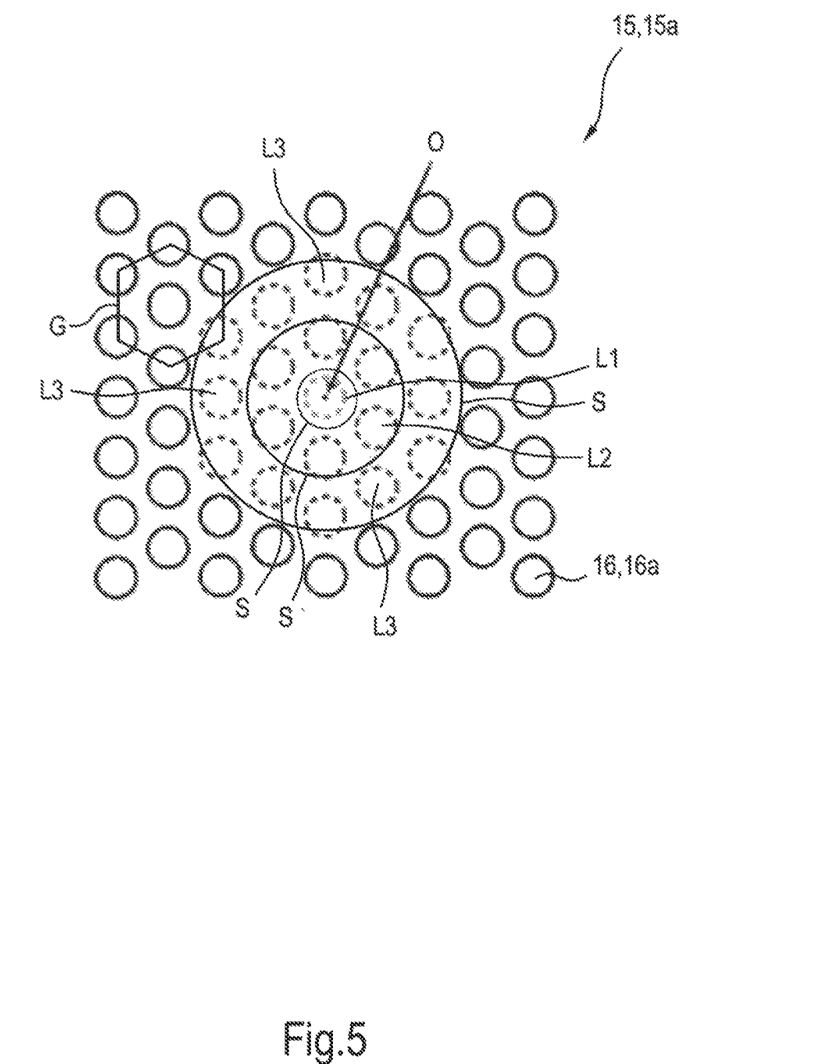
FIG. 5 shows a front view of an arrangement of circular holes in a flat shielding plate with a possible location of a field of view of the camera.

FIG. 5 shows a front view of a possible embodiment of a shielding plate 15, 15a. The holes 16, 16a are circular and arranged in a regular pattern. The pattern has a hexagonal, centrally filled base cell G. It can also be seen as a pattern with alternating lines offset laterally by half a position and/or alternating columns offset vertically by half a position.

The visual axis O may in particular run centrally through one hole L1 of said holes 16, 16a. Depending on the size of the field of view S at the shielding plate 15 (or depending on the size of the visible area), only this hole L1 may be in the field of view S, or the next circle of holes L2 may also be at least partially (in particular largely, in other words with more than 50% of its area) in the field of view S, or a further circle of holes L3 may also be at least partially (in particular largely) in the field of view S, etc. The holes L1, L2, L3 are shown with broken lines.

The group of holes 16a in the field of view S of the camera 2 has six-fold rotational symmetry in relation to a rotation about the visual axis O, in other words the group of holes 16a is mapped onto itself six times during a full rotation about the visual axis O (in other words through 360°), through 60° for each rotation.

When the camera 2 is aligned obliquely, the field of view S at the shielding plate 15 may be for example oval in shape.

Figure 6:
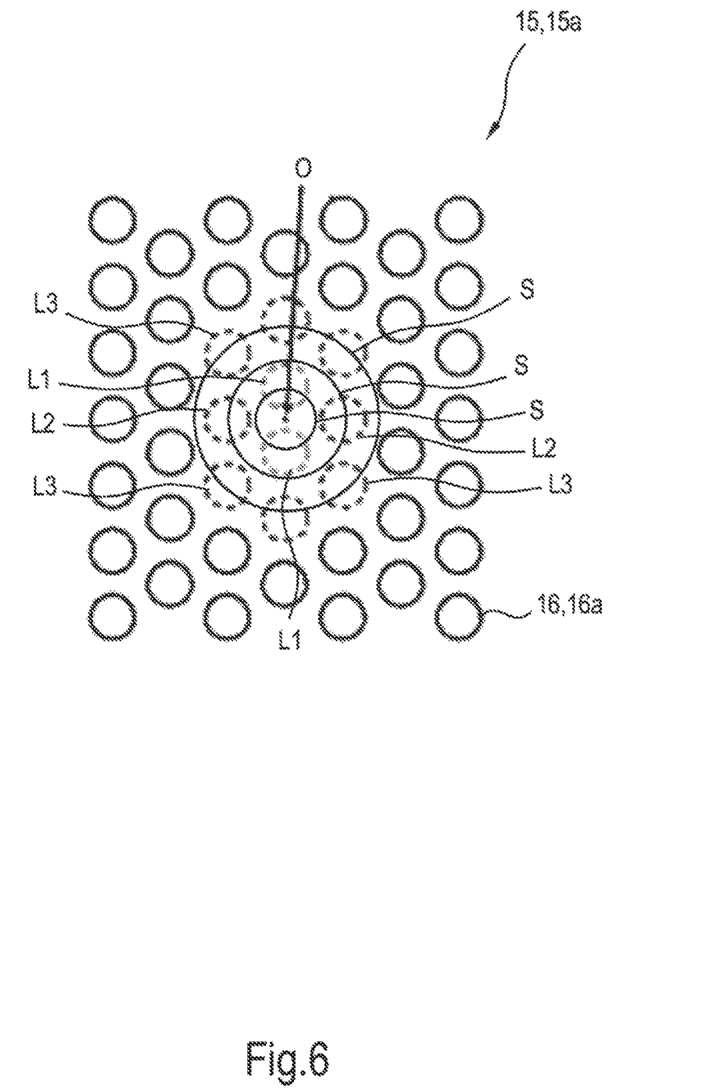
FIG. 6 shows a front view of an arrangement of circular holes in a flat shielding plate with a different possible location of the field of view of the camera.

FIG. 6 shows a front view of the arrangement of the holes 16, 16a in the flat shielding plate 15 with a different possible location of the field of view S of the camera 2. Here the visual axis O does not run through a hole 16a but lies in the center of a connecting line connecting the centers of two adjacent holes 16a.

A smallest practically useful field of view S only includes these two holes 16a, L1 at least partially, a next largest field of view S also includes the next adjacent holes 16a, L2 and an even larger field of view S includes the remaining next adjacent holes 16a, L3, etc.

The group of holes 16a in the field of view S of the camera 2 here has a two-fold rotational symmetry in relation to a rotation about the visual axis O, in other words the group of holes 16a is mapped onto itself twice during a full rotation about the visual axis O, through 180° for each rotation.

Figure 7:
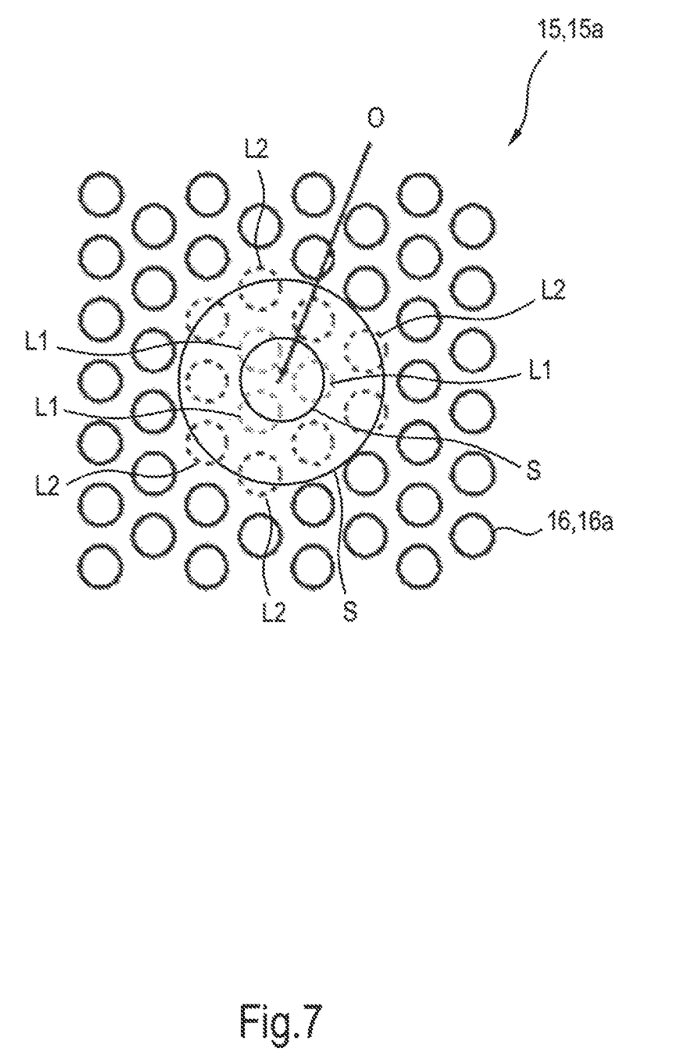
FIG. 7 shows a front view of an arrangement of circular holes in a flat shielding plate with yet another different possible location of the field of view of the camera.

FIG. 7 shows a front view of the arrangement of the holes 16, 16a in the flat shielding plate 15 with yet another possible location of the field of view S of the camera 2. Here the visual axis O runs through the center of three adjacent holes 16a.

A smallest practically useful field of view S now includes these three holes 16a, L1 at least partially, a next largest field of view S also includes the surrounding holes 16a, L2 at least partially, etc.

The group of holes 16a in the field of view S of the camera 2 here has a three-fold rotational symmetry in relation to a rotation about the visual axis O, in other words the group of holes 16a is mapped onto itself three times during a full rotation about the visual axis O, through 120° for each rotation.

Figure 8:
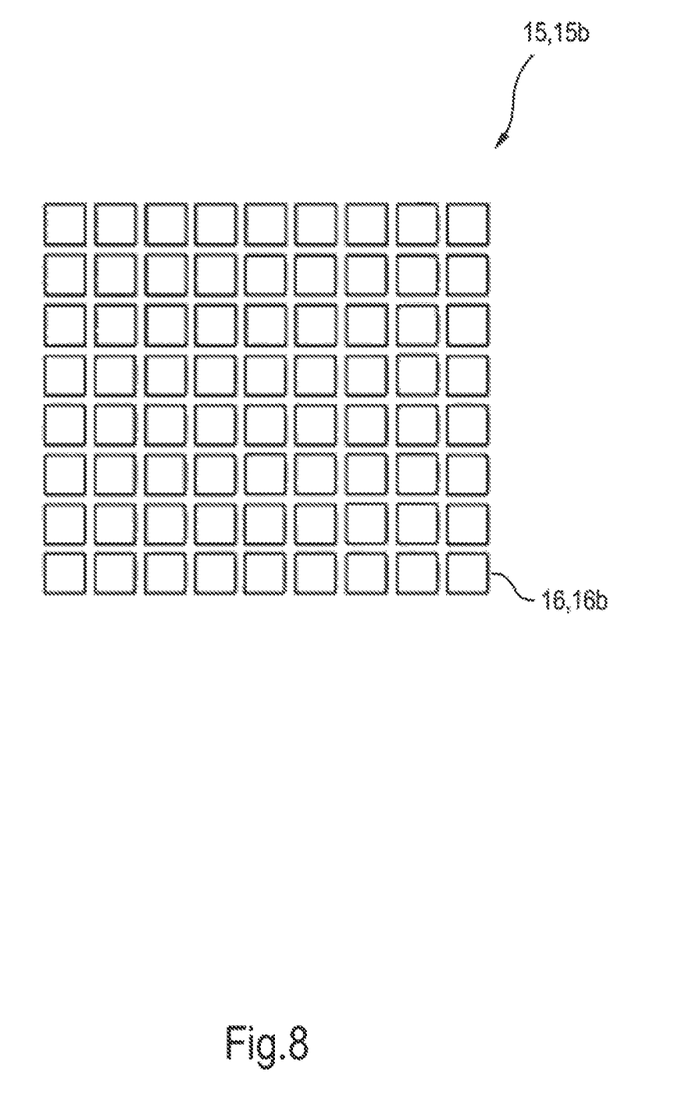
FIG. 8 shows a front view of an arrangement of lozenge-shaped holes in a flat shielding plate.

FIG. 8 shows a front view of an arrangement of lozenge-shaped holes 16, 16b in a flat shielding plate 15, 15b. The lozenge-shaped holes are configured as square holes 16b here, arranged upright in a regular (m×n) matrix pattern where m, n>=8 by way of example.

Figure 9:
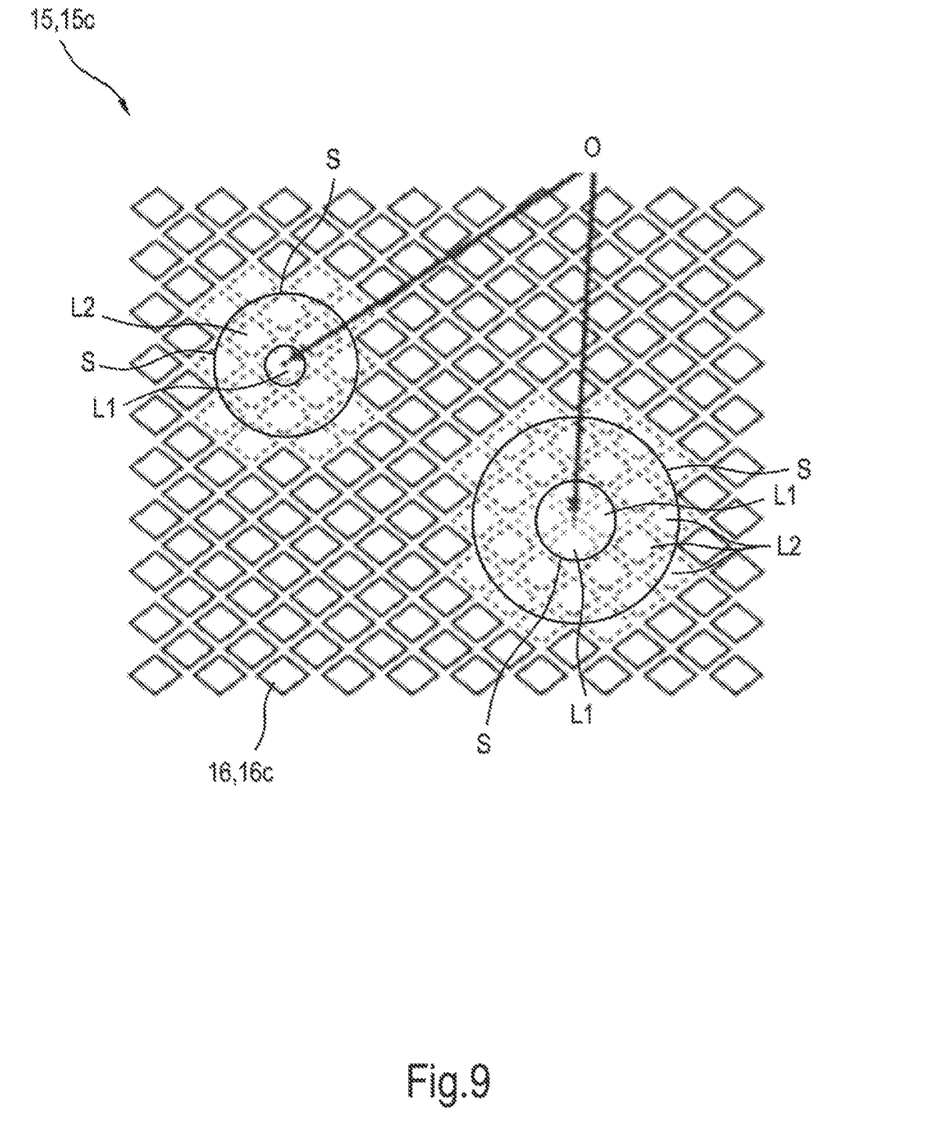
FIG. 9 shows a front view of an arrangement of different lozenge-shaped holes in a flat shielding plate with two possible locations of fields of view of the camera.

FIG. 9 shows a front view of an arrangement of different lozenge-shaped holes in a flat shielding plate 15, 15c with two possible locations of fields of view S of the camera 2. The shielding plate 15c has a pattern with alternating lines of lozenge-shaped holes 16, 16c offset laterally by half a position and/or alternating columns of lozenge-shaped holes 16, 16c offset vertically by half a position. The holes 16c here are configured as oblique lozenges arranged on their heads.

With a field of view S shown on the left the visual axis O runs centrally through a hole 16c, L1, while in a field of view S shown on the right it runs in the center of four holes 16c, L1 surrounding it.

Figure 10:
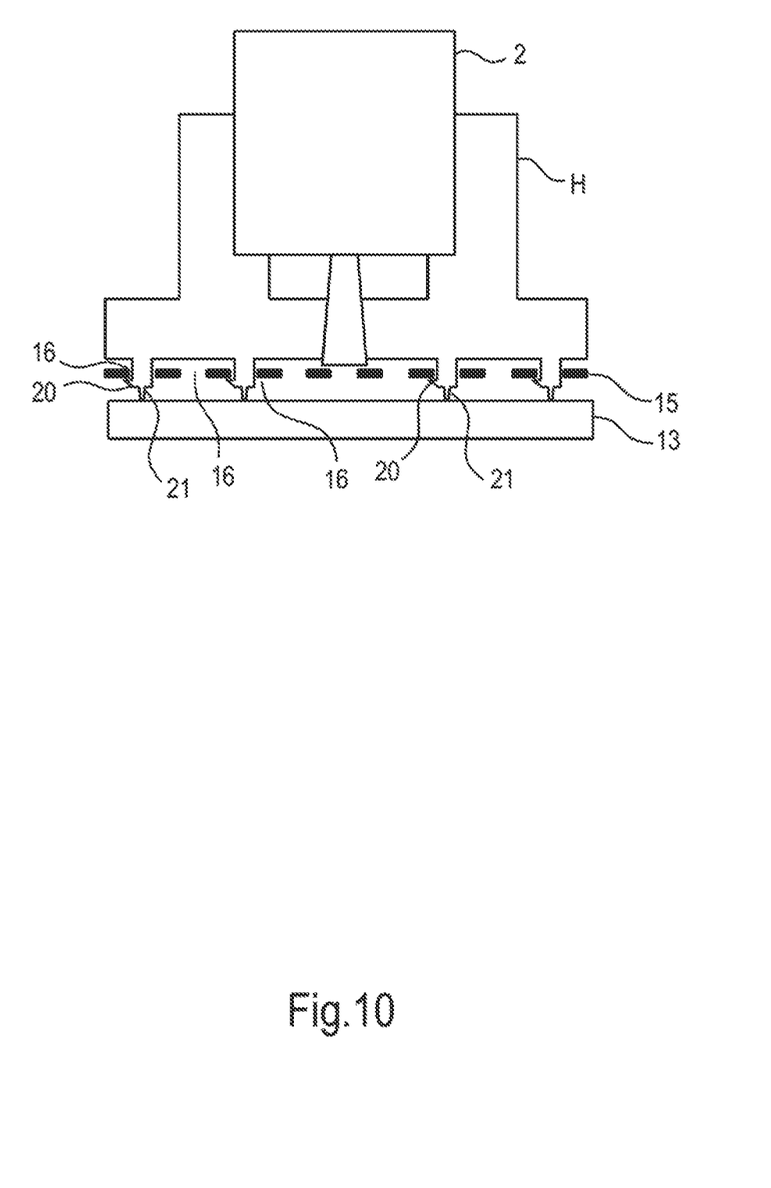
FIG. 10 shows a sectional diagram of a side view of a camera positioned on the shielding plate.

FIG. 10 shows a sectional diagram of a side view of a camera 2 positioned on the shielding plate 15. The camera 2 is connected in a latched manner directly, or as shown here, by way of a support H, to the shielding plate 15. To this end the support H has a number of lugs or hooks 20 on its side facing the shielding plate 15 and these engage behind the shielding plate 15. The camera 2 can then only be connected in a latching manner to the shielding plate 15 when all the hooks 20 can latch into corresponding holes 16. This results in a very high level of positioning accuracy.

At their end facing the shielding plate 15 the hooks 20 have a narrow tip 21 running in the direction of the shielding plate 15. This serves as a spacer in relation to the shielding plate 15 and ensures for example that the distance between the shielding plate 15 and the glass pane 13 is maintained. The tips 21 also help with simple insertion into the holes 16.

Figure 11:
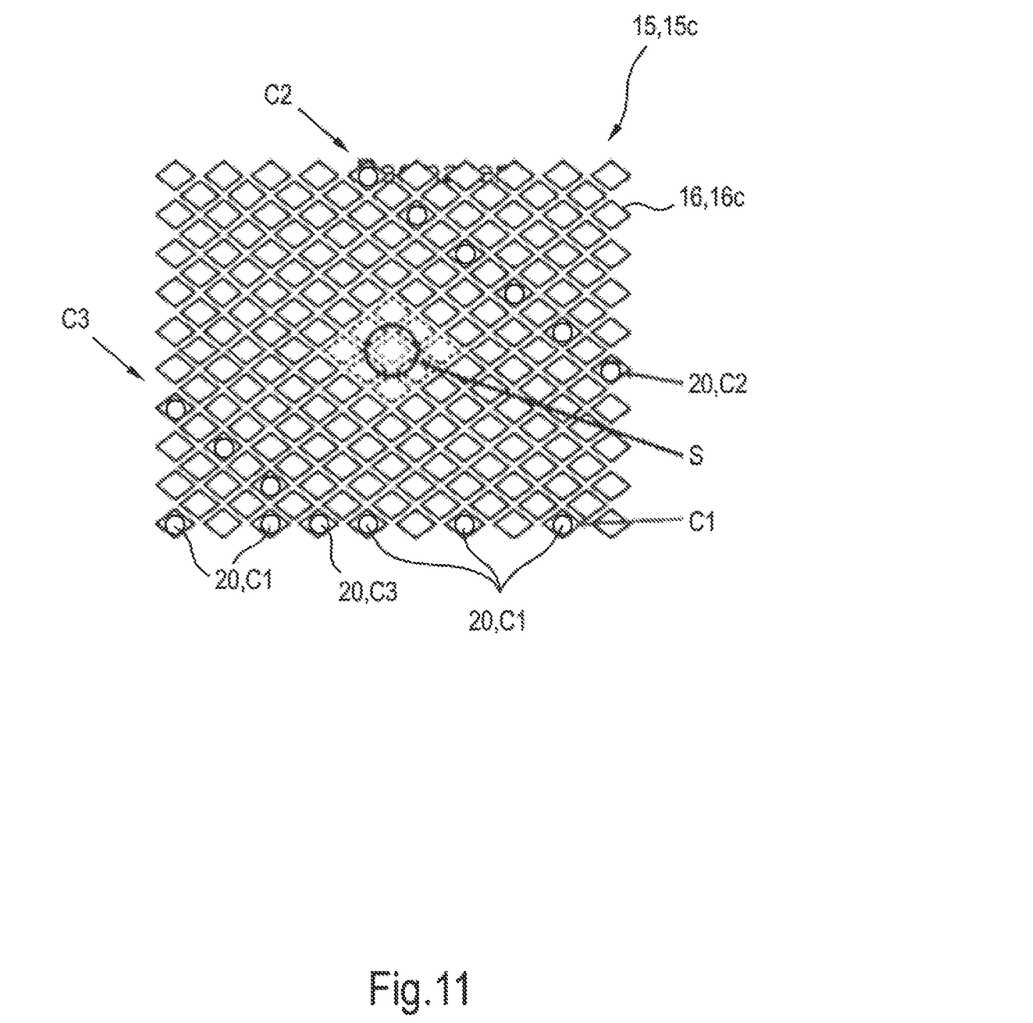
FIG. 11 shows a front view of the arrangement of the lozenge-shaped holes in the shielding plate in FIG. 9 with latching elements of the camera arranged thereon.

FIG. 11 shows a front view of the arrangement of the lozenge-shaped holes 16c in the shielding plate 15c in FIG. 9 with hooks 20 on the camera 2 arranged thereon. The camera 2 is fastened to two lines C1 and C2 or C3 and C2 of holes 16c in the shielding plate 15c, with the field of view S of the camera 2 being located between these.

Figure 12:
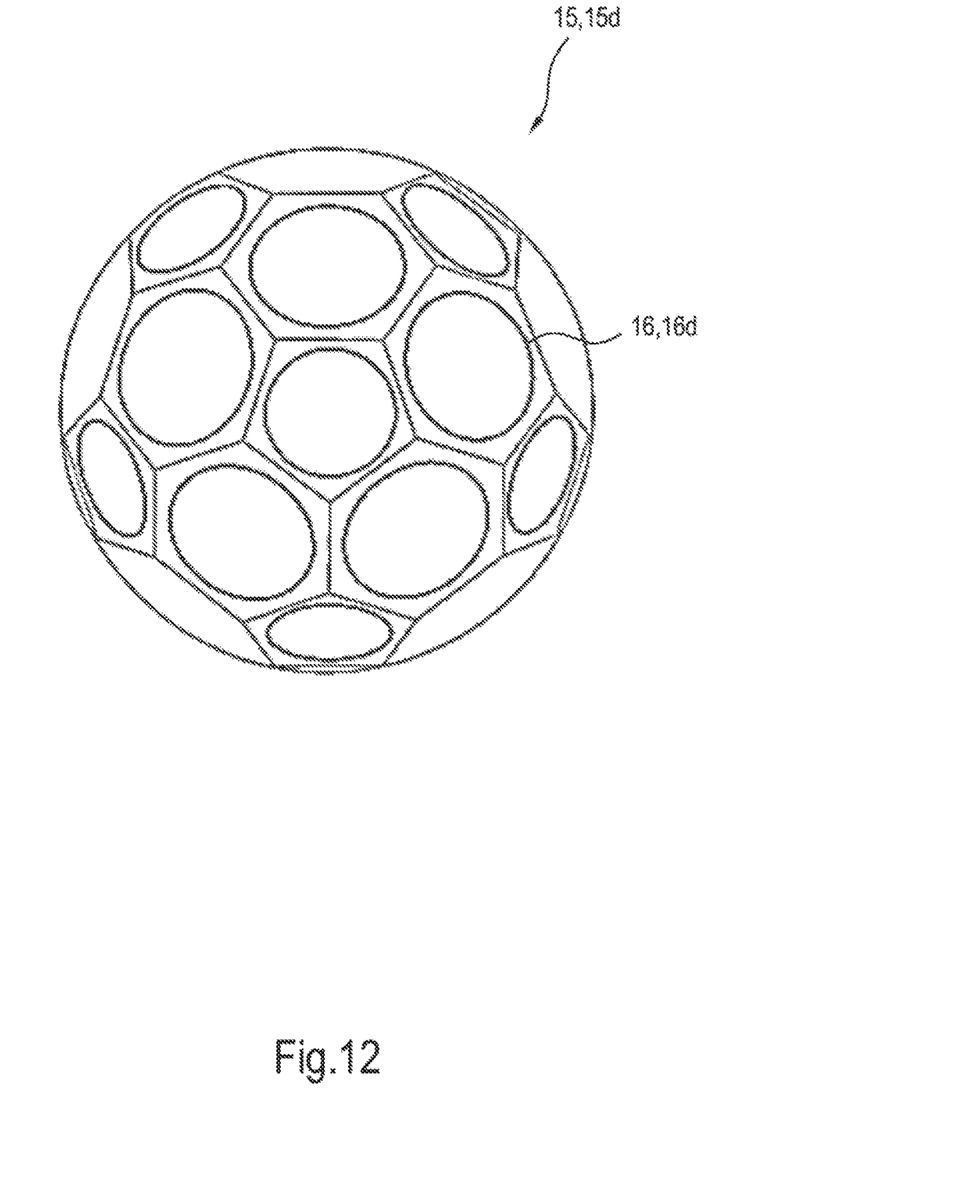
FIG. 12 shows a front view of an arrangement of holes in a curved shielding plate.

FIG. 12 shows a front view of an arrangement of circular holes 16, 16d in a shielding plate 15d that arches or curves in the manner of a spherical cap or spherically in the direction of the food treatment chamber 4.

The present invention is of course not restricted to the exemplary embodiments shown.

Generally "one" can refer to one or a number, in particular in the sense of "at least one" or "one or more", unless this is specifically excluded, for example by the expression "just one", etc.

Also a figure can cover just the figure given as well as a standard tolerance range, unless this is specifically excluded.

The invention claimed is:

1. A household appliance constructed in the form of a microwave appliance, comprising:
    a food treatment chamber including a loading opening which is closeable by a door, said food treatment chamber being exposable to microwaves;
    a viewing window;
    a shielding plate received in the viewing window and including a number of holes; and
    a camera for observation of the food treatment chamber through the viewing window, said camera being directly fastened to holes of the number of holes in the shielding plate and directed onto the shielding plate such that at least one hole of the number of holes is in a field of view of the camera,
    wherein the viewing window is positioned between the camera and the food treatment chamber when the door is in a closed position.

2. The household appliance of claim 1, wherein the camera is latched onto the holes in the shielding plate.

3. A household appliance constructed in the form of a microwave appliance, comprising:
    a food treatment chamber including a loading opening which is closeable by a door, said food treatment chamber being exposable to microwaves;
    a viewing window;
    a shielding plate received in the viewing window and including a number of holes; and
    a camera for observation of the food treatment chamber through the viewing window, said camera being fastened to holes of the number of holes in the shielding plate and directed onto the shielding plate such that at least one hole of the number of holes is in a field of view of the camera,
    wherein the camera is latched onto the holes in the shielding plate, and
    the camera has latching elements for latching in the holes, at least one of the latching elements having a narrow tip.

4. The household appliance of claim 1, wherein the shielding plate is a flat plate and the camera is directed obliquely onto the shielding plate.

5. The household appliance of claim 1, wherein the shielding plate is a flat plate and a central axis of the field of view of the camera is directed onto the shielding plate such that the central axis is perpendicular to the shielding plate.

6. The household appliance of claim 5, wherein the shielding plate extends at an angle to a vertical.

7. The household appliance of claim 1, wherein the shielding plate is a plate arched in a direction of the food treatment chamber.

8. The household appliance of claim 1, wherein the holes in the shielding plate have edges that are rounded in cross section.

9. The household appliance of claim 1, wherein the camera and the viewing window are arranged in the door.

10. A household appliance constructed in the form of a microwave appliance, comprising:
    a food treatment chamber including a loading opening which is closeable by a door, said food treatment chamber being exposable to microwaves;
    a viewing window;
    a shielding plate received in the viewing window and including a number of holes; and
    a camera for observation of the food treatment chamber through the viewing window, said camera being directly fastened to holes of the number of holes in the shielding plate and directed onto the shielding plate such that at least one hole of the number of holes is in a field of view of the camera, wherein the camera defines a visual axis which is directed onto a point of the shielding plate which point is a center point of a group of holes in the field of view of the camera.

11. The household appliance of claim 10, wherein the group of holes in the field of view of the camera has an at least two-fold rotational symmetry.

12. A household appliance constructed in the form of a microwave appliance, comprising:

a food treatment chamber including a loading opening which is closeable by a door, said food treatment chamber being exposable to microwaves;

a viewing window;

a shielding plate received in the viewing window and including a number of holes; and a camera for observation of the food treatment chamber through the viewing window, said camera being fastened to holes of the number of holes in the shielding plate and directed onto the shielding plate such that at least one hole of the number of holes is in a field of view of the camera, wherein the camera is fastened to at least two lines of holes in the shielding plate, with the field of view of the camera being located between the lines of holes.

13. The household appliance of claim 1, wherein the viewing window has a transparent pane arranged between the shielding plate and the food treatment chamber at a distance from the shielding plate.

14. The household appliance of claim 2, wherein the camera has latching elements for latching in the holes, at least one of the latching elements having a narrow tip.

15. The household appliance of claim 1, wherein the camera defines a visual axis which is directed onto a point of the shielding plate which point is a center point of a group of holes in the field of view of the camera.

16. The household appliance of claim 15, wherein the group of holes in the field of view of the camera has an at least two-fold rotational symmetry.

17. The household appliance of claim 1, wherein the camera is fastened to at least two lines of holes in the shielding plate, with the field of view of the camera being located between the lines of holes.

* * * * *